No. 790,138.

Patented May 16, 1905.

UNITED STATES PATENT OFFICE.

ALFRED KOELLIKER, OF BEUEL, GERMANY.

PROCESS OF OBTAINING NICOTIN.

SPECIFICATION forming part of Letters Patent No. 790,138, dated May 16, 1905.

Application filed November 30, 1903. Serial No. 183,215.

*To all whom it may concern:*

Be it known that I, ALFRED KOELLIKER, manufacturing chemist, of 4 Nordstrasse, Beuel-on-the-Rhine, in the German Empire, have invented a new and useful Method of Producing Nicotin and Its Salts; and I declare the following to be a full, clear, and exact description thereof, which will enable others skilled in the art to which my invention appertains to make and use the same.

Hitherto the nicotin was produced by extracting tobacco by means of alcohol, distilling the extract thus obtained with water until the alcohol is evaporated, then adding caustic lye, extracting the nicotin by shaking with ether, evaporating the latter, and drying the remainder over burnt chalk in a hydrogen-current. Now this method is very circumstantial and not suited for producing nicotin and its salts on a larger scale. These disadvantages are obviated by my new process, which is very simple and by means of which I am able to produce nicotin and its salts, especially salicylate of nicotin on a large scale and at comparatively low costs.

I proceed as follows: Tobacco or tobacco-waste are extracted with water, as hitherto, in order to produce tobacco extract. This latter after addition of an alkali is subjected to the distillation by means of steam. The distillate thus obtained is neutralized with a suitable acid and evaporated, whereby the nicotin salt of the acid used is produced. I decompose the same by means of an alkali and purify the nicotin in a suitable manner.

In order to enable others skilled in the art to use the invention, I will now, by way of example, describe the manner in which my new process may be carried out.
In carrying out my process the tobacco extract containing sulfuric acid is mixed with a lye of sodium hydrate of 1.3 specific weight in order to neutralize the acid extract. Then a lye of carbonate of sodium of 18° Baumé or of 1.4 specific weight is added, because the nicotin is better freed by means of carbonate of sodium than by means of soda or sodium hydrate. The whole liquid is then distilled in a current of steam. To the distillate thus obtained sulfuric acid is added (twelve to thirteen kilogram parts of acid to one hundred kilograms of tobacco extract) for the purpose of neutralizing the alkali and combining the nicotin contained in the distillate with the sulfuric acid, thus producing sulfate of nicotin, as otherwise by the concentration of the distillate the nicotin would evaporate with the steam. The quantity of sulfuric acid will have to be distinctly determined for each process, as the quantity of alkali used in the preceding part of the process varies or depends upon the quantity of the acid. The mixture is now evaporated until crystallization begins. The crystals are for the greater part sodium sulfate. The expression "until crystallization begins" is well understood by chemists. The heating or evaporation is interrupted just when a thin skin of crystals is being formed on the liquid. The formation of real crystals must be prevented. To the mixture is then added a lye of caustic soda of 1.3 specific weight until the action is alkaline, whereby nicotin of the desired percentage is separated. The liquid is now dried by means of chlorid of calcium or water-free potash or other equivalent material in granular or powdered form and is separated from the drying substance in any desirable manner—for example, by means of filtration. The nicotin is then mixed with that quantity of salicylic acid as according to the formula is necessary for the formation of salicylate of nicotin.

Having thus described my invention and in what manner the same is to be performed, I declare that what I claim as new, and desire to secure by Letters Patent, is—

The hereinbefore-described process of obtaining nicotin consisting of mixing with tobacco extract containing sulfuric acid, a lye of sodium hydrate to neutralize the acid, distilling the mixture, adding sulfuric acid to the distillate, evaporating until crystallization commences, and adding a lye of caustic soda to secure an alkaline reaction.

In witness whereof I have hereunto set my hand in presence of two witnesses.

ALFRED KOELLIKER.

Witnesses:
WILHELM KÜPPER,
GUSTAV ELSNER.